United States Patent
Zernik et al.

(10) Patent No.: US 8,194,848 B2
(45) Date of Patent: Jun. 5, 2012

(54) ADAPTIVE, SELF-LEARNING OPTIMIZATION MODULE FOR RULE-BASED CUSTOMER INTERACTION SYSTEMS

(75) Inventors: Dror Zernik, Haifa (IL); Itai Gordon, Zichron Yaakov (IL); Hovav Lapidot, New York, NY (US); Eshay Livne, Karkur (IL)

(73) Assignee: Nice Systems Ltd., Raanana (IL)

(*) Notice: Subject to any disclaimer, the term of this patent is extended or adjusted under 35 U.S.C. 154(b) by 1426 days.

(21) Appl. No.: 11/801,392

(22) Filed: May 9, 2007

(65) Prior Publication Data

US 2008/0279363 A1    Nov. 13, 2008

(51) Int. Cl.
*H04M 3/00* (2006.01)
*H04M 5/00* (2006.01)

(52) U.S. Cl. ......... 379/265.03; 379/265.01; 379/265.05; 379/265.06

(58) Field of Classification Search ............. 379/265.03, 379/265.05, 265.06, 265.01
See application file for complete search history.

(56) References Cited

U.S. PATENT DOCUMENTS

| | | | |
|---|---|---|---|
| 7,953,219 B2* | 5/2011 | Freedman et al. | 379/265.06 |
| 2004/0093343 A1 | 5/2004 | Scott et al. | |
| 2005/0159994 A1* | 7/2005 | Huddleston et al. | 705/10 |
| 2006/0262922 A1* | 11/2006 | Margulies et al. | 379/265.12 |
| 2007/0198323 A1* | 8/2007 | Bourne et al. | 705/10 |

FOREIGN PATENT DOCUMENTS

| | | |
|---|---|---|
| EP | 1 191 772 | 3/2002 |
| WO | WO 01/50336 | 7/2001 |
| WO | WO 2006/124113 | 11/2006 |

* cited by examiner

*Primary Examiner* — Ahmad Matar
*Assistant Examiner* — Nafiz E Hoque
(74) *Attorney, Agent, or Firm* — Pearl Cohen Zedek Latzer, LLP

(57) ABSTRACT

The invention relates to a call center system having automatic means for optimizing those rules that are enforced over interactions with customers, said system comprises: (a) an infrastructure which comprises a CRM module for at least handling the interactions with customers, and hardware means for at least maintaining the communication with said customers; (b) management rules, each rule comprising one or more rule parameters, said rules parameters enforcing interaction behavior during all interactions with customers; and (c) an adaptive, self learning module, for: (c.1) monitoring all interactions with customers; (c.2) upon completion of each interaction, recording a corresponding set of full interaction details, said set of full interaction details includes those rule parameters that were enforced during said interaction, and those additional interaction parameters that are specific to that interaction; and (c.3) using an adaptive engine, periodically analyzing one or more of said sets of recorded full interaction details, and producing one or more modified rules having modified rule parameters, and enforcing said modified rules over future interactions with customers.

18 Claims, 6 Drawing Sheets

ADAPTIVE, SELF-LEARNING OPTIMIZATION MODULE FOR RULE-BASED CUSTOMER INTERACTION SYSTEMS

FIELD OF THE INVENTION

The present invention relates in general to the field of Customer Relationship Management (CRM) systems, and particularly to systems which automatically optimizes a corporate rules that are enforced on corporate agents at a call center or over the web.

BACKGROUND OF THE INVENTION

Call centers are becoming a key channel for managing corporate-to-customer relations. A call center allows for both 24 hours-7 days a week service and support, as well as for selling and marketing of the corporate products. Call centers have become an industry, which relies on hardware (switch boxes, computer-telephone interfaces) as well as software for managing the interactions (Customer Relation Management, CRM). Call centers vary in size, from a single agent, to hundreds of agents. The agents in call centers are trained to handle as many calls as possible, while reflecting during their customer interactions the corporate goals in terms of branding, needs, standards, and customer understanding. Since a call center is often a large operation, with a substantial management chain, sometimes operated by a sub-contractor, modifying the agents' behavior is a complex and sensitive task. Any modification must be carefully analyzed, monitored and approved, before it is deployed by the multitude of agents.

Since the call center should desirably be a profit center, where sales take place, customers are being served, and if possibly retained, therefore, controlling and monitoring the agents' dialogue is of highest importance. The most common tool for this monitoring is either recording the interactions with the customers for later analysis, or allowing the supervisor to tap into the call in real-time.

These tools provide limited capabilities and are generally applied for monitoring a single agent conversation. Additional software tools have been built which monitor Key Performance Indicators (KPI) of the entire call center, or of some sub-groups, or even of each individual agent. These indicators are typically used for performing a load balancing and for identifying and resolving operational problems.

In today's rapidly changing markets there is a need for a continuous reevaluation of business strategies and for adjustment of business policies according the market needs, and moreover, for deployment of these adjustments rapidly. Furthermore, the market behavior may be periodic in nature, where the period may vary from days to seasons. Dramatic global events may cause additional market changes, which may reflect at the call-center as different interactions, and different opportunities for the corporate. This sets a need to change rapidly, to adopt to unexpected events, and to do all this in a controlled manner.

Today, these changes are recognized posteriori by deploying an analytic CRM environment or by using data mining tools external to the CRM system. These tools provide analysis of data which has been collected over a long period. The tools typically look for correlations between the various parameters of the call, the agent, the customer and the product, and for patterns of failure or success, and they accordingly offer the call-center management new rules for managing the agents' behavior.

As said, typical call center management systems provide little functionality for continual modification of the agents' behavior. In existing typical systems, business managers (or similar) define business and marketing rules, that are enforced on the corporate agents. For example, the corporate products are priced, offered, and presented to the customers based on said rules. The term "product", as used herein, refers to any good that the corporate offers, including a service. The business and marketing rules ensure compliance of the corporate agents to the corporate marketing policy and regulations. The rules are used, among others, for guiding the agents, modifying the product presentation when necessary, defining customer eligibility for a certain service or price, and for monitoring the performance of the various agents. Typically, the introduction of a new or modified rule to the various call center agents involves a long cycle of training, acceptance, and application of the rule, a process that may take several months or sometimes even more than a year. One main reason for such a problem is the fact that in traditional CRM systems the rules are hard-coded into the call center software.

A major breakthrough in the design of CRM tools was has occurred by the introduction of the ability to separate the business rules from the software. Instead of being hard-coded into the management environment, the rules are formally stated, and they are compiled or translated into a behavior pattern, affecting the software flow. As a result, a new era of CRM tools has developed—commonly referred to as Analytic CRM. Using Analytic CRM tools the rules are studied, selected, and approved, and then implemented into the next CRM version. This cycle is typically completed twice a year, or in the short case within a magnitude order of months.

This is practically true for any marketing channel, where a long management chain is involved, and multitude of customers interact with the organization's channel. For example, in Web-based services which provide purchasing, support, or information.

The present invention discloses an adaptive fast loop mechanism of performance-monitoring—decision-making and behavior-modification, of agents in a call-center. The adaptive mechanism of the present invention allows for a quick response to the market needs as well as to the call-center performance parameters. The invention can therefore significantly improve all of the KPIs of the call-center.

The following example relates to call center of a bank, and explains problems that arise from the structure of a typical call center. A marketing manager within a corporate defines a business rule, which the corporate agents have to abide to. The rule states as follows:

a. If a cash account owner lives in any of the cities {A, B, or C}; and
b. If the balance of said cash account is above $10,000; and
c. If the cash account owner now wishes to open a saving account; then
d. You may offer the account owner a promotion plan with parameter details {X, Y, Z}.

At the time of forming the rule relating to this promotional plan, the marketing manager may have had reasons for selecting these specific parameters. Some of the rule parameters may have evolved from pre-conditions that have to be met, for example, state regulations. Other parameters may have resulted from economic considerations. However, what clearly makes one bank more successful than others are those adaptations that are made in order to sell more, and in order to be more attractive to the its customers. In the example above, it may be that residents of a city D are eligible for this plan as well. Further, it may be the case that the regulator requires that the customer balance is above $5,000 in order to be eligible for the promotion plan. It is the bank estimates that caused the rule to include a limit of a $10,000 balance, based on the assumption that this offer will not be attractive to people with less than $10,000 balance.

With respect to the above example, it is desired to provide a mechanism for automatically determining and offering the preference on how to update of the rule, such that: (a) City D is also included in the rule; (b) Cities which are found to be not attractive are removed from the rule; and (c) The exact account balance where it is worth to offer this promotional plan is determined. The result of the desired system might suggest updating the rule as follows:

a. If the account owner lives in any of the cities {A, B, or D} (C was removed, D added); and
    b. If the account balance is more than $11,000; and
    c. If the owner wishes to open a savings account; then
    d. You may offer promotion plan with details {X, Y, R} (Z was replaced by R).

It is therefore an object of the present invention to provide a call center system having mechanism for analyzing the impacts of application of various call center rules, and for determining optimized parameter values for each of the corporate call center rules.

It is another object of the present invention to provide a mechanism for performing said analysis in a very short cycle.

It is still another object of the present invention to provide a mechanism which performs said analysis automatically.

It is still another object of the present invention to periodically replace rules parameters by the optimized parameter values, as determined by said mechanism.

It is still another object of the present invention to provide constraints for the range of new rule parameters, in order to allow for tight control and conformance with regulations, as determined by said mechanism.

It is still another object of the present invention to provide all of the above for organizations providing service to customers over the web.

Other object and advantages of the present invention will become apparent as the description proceeds.

SUMMARY OF THE INVENTION

A call center system having automatic means for optimizing those rules that are enforced over interactions with customers, said system comprises: (a) an infrastructure which comprises a CRM module for at least handling the interactions with customers, and hardware means for at least maintaining the communication with said customers; (b) management rules, each rule comprising one or more rule parameters, said rules parameters enforcing interaction behavior during all interactions with customers; and (c) an adaptive, self learning module, for: (c.1) monitoring all interactions with customers; (c.2) upon completion of each interaction, recording a corresponding set of full interaction details, said set of full interaction details includes those rule parameters that were enforced during said interaction, and those additional interaction parameters that are specific to that interaction; and (c.3) using an adaptive engine, periodically analyzing one or more of said sets of recorded full interaction details, and producing one or more modified rules having modified rule parameters, and enforcing said modified rules over future interactions with customers.

Preferably, the system further comprises a boundary editor by which a user can limit the degree of freedom of said adaptive engine, by setting allowed ranges for the modified rule parameters that the engine is allowed to produce.

Preferably, the operation of the adaptive engine is governed by means of a predefined success function.

Preferably, the system further comprises a success function editor for enabling a user to define or modify said success function.

Preferably, the system further comprises a modeling tool which is in communication with said adaptive engine, said modeling tool is used for finding correlations between various sets of full interaction details, predicting future interaction behaviors, and determining specific values for rule parameters.

Preferably, the system further comprises a reporter module for issuing reports regarding the progress or optimization changes that were affected by said an adaptive, self learning module.

Preferably, the system further comprises a clock and counter for scheduling the operation of said adaptive engine.

Preferably, the sets of full interaction details relating to various interactions are recorded within an experiment recording storage.

Preferably, the entire adaptation engine and its success function which governs the operation of the adaptive engine is a genetic algorithm.

Preferably, the call center is a telephone call center, comprising a plurality of agents' terminals, and wherein the rules are enforced during operation of said terminals.

Preferably, the call center is a Web based interactions, in which customers access the organization's systems via the Web.

Preferably, the modeling tool is comprised of data mining engine.

DETAILED DESCRIPTION OF PREFERRED EMBODIMENTS

The present invention demonstrates how the formation of rules, monitoring of the agents interactions, and adaptive analysis of the interactions in real time, or in a sufficiently short cycle, can be used for the introduction of modifications into the CRM rules.

In order to improve and adjust any call center system that obeys rules, modifications to existing rules requires: (a) monitoring the system behavior; (b) analysis of observations; (c) new rule formation; (d) publishing of the new rules (i.e., updating all of the agents); and (e) training (i.e., ensuring the acceptance and application of the modified rules by all the agents). Typically, in the prior art this process was the responsibility of the call center management in cooperation with marketing department, and therefore was carried out manually, and could not be an adaptive, on-going process. This process introduces drawbacks, since the process requires a very long cycle, it does not allow for easily generating data points, and it does not utilize the inbound call center for discovery and on-going adaptation.

The present invention overcomes the drawbacks of the prior art by automating this process through the introduction of a learning engine, that manages the rules, and completes the above entire cycle using sophisticated adaptive techniques.

Figure 1:
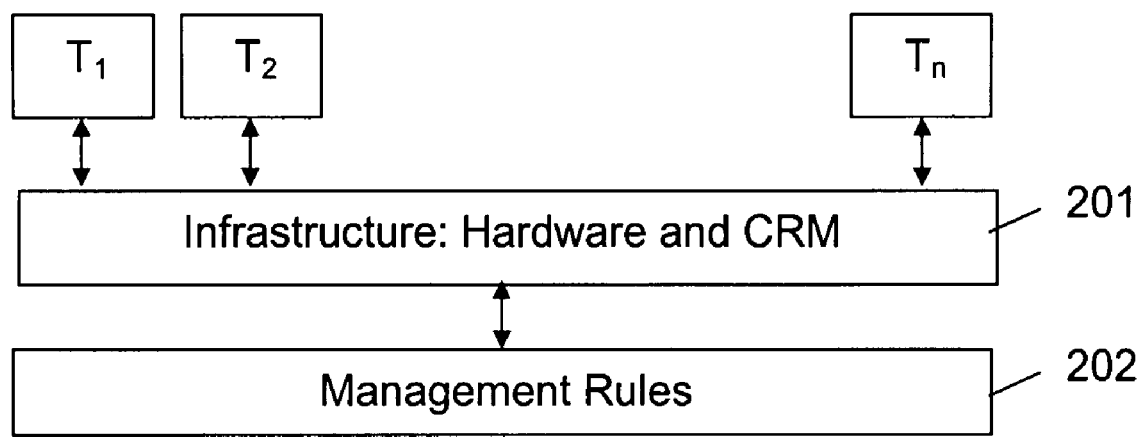
FIG. 1 is a block diagram illustrating a general structure of a typical call center, including the software applications associated with it.

FIG. 1 is a block diagram illustrating a general structure of a typical call center, including the software applications associated with it. The call center comprises plurality of terminals $T_1$-$T_n$ that are operated by the corporate agents. In addition, there are infrastructure layers 201 that comprise hardware and software, the most dominant application is the CRM (Customer Relation Management). Other applications are also typically provided within said infrastructure 201, such as, ERP (Enterprise Resource Planning), billing applications, mail and administrative application, etc., and the agents access all said application through their terminals. In order to set the corporate policies, to allow for detailed guidance, and to manage the combined infrastructure use by the agents, a rule layer 202 is provided, where detailed specific scenarios are identified, and required actions are enabled, prevented, or enforced. The call center management in cooperation with the marketing group and the customer care group identifies from time to time rules that need to be changed, added, or removed. It then requests these change from the IT group, which deploys and manages the rules. A rule is typically a pair of condition and action. The condition generally consists of an expression using multiple parameters. The action comprises additional parameters, and it is designed for the agent to use and apply, thus reflecting the corporate policy.

Figure 2:
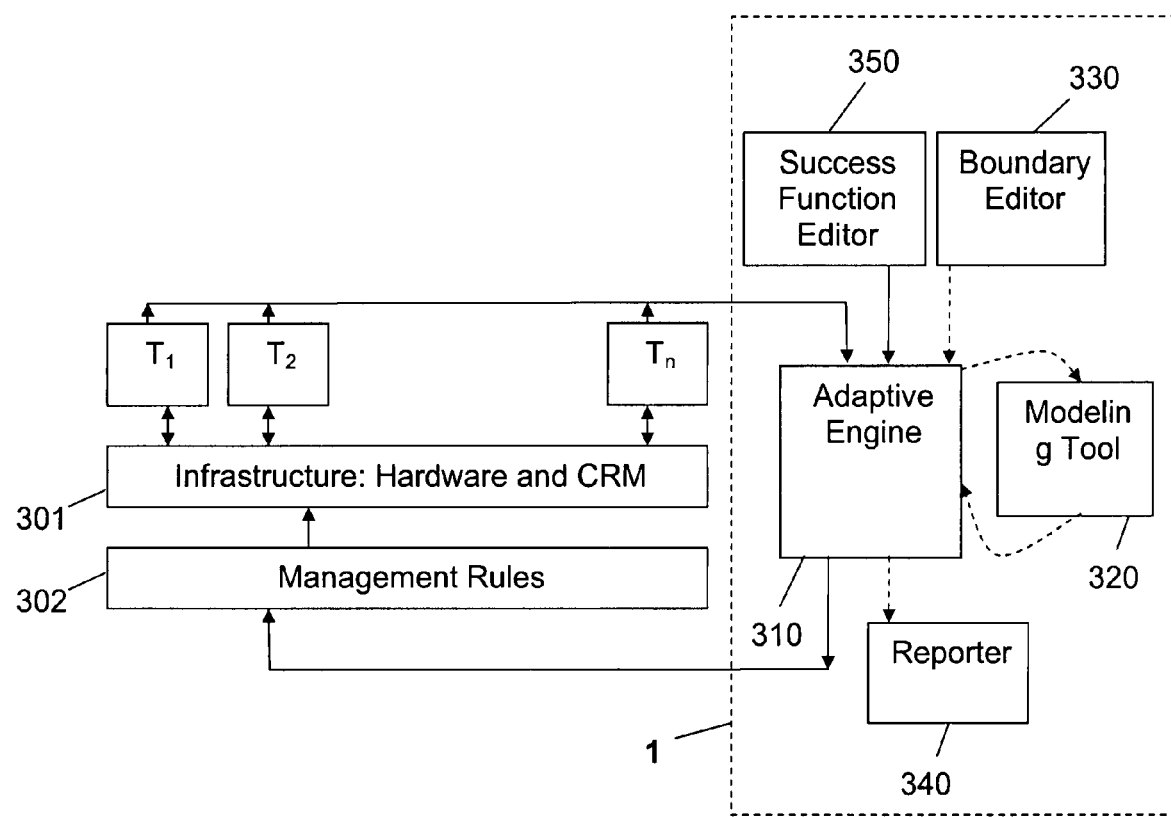
FIG. 2 is a general block diagram of a call center system according to an embodiment of the present invention.

FIG. 2 is a general block diagram of a call center system according to an embodiment of the present invention, which includes an adaptive, self learning module 1. The system comprises, as before, a plurality of agent terminals $T_1$-$T_n$, infrastructure layers 301, and management rules 302, respective to those of FIG. 1. Furthermore, the system of the present invention comprises an adaptive, self learning module 1, whose core component is the adaptive engine 310. This adaptive, self learning module 1 is responsible for automatically completing the adaptive cycle. Adaptive engine 31 monitors the business behavior, its changes over time, and suggests adaptations of the rules to better fit the business changes.

According to the present invention, adaptive, self learning module 1 monitors interactions between the various agents and customers, and collects data regarding the same, analyses said collected data, generates modified or new rules, and submits them to the management rules 302 in order to apply them by the agents, and improve future interaction results.

The adaptive, self learning module 1 of the present invention optionally also comprises a modeling tool 320, that allows for finding correlations, predicting behaviors, and finding specific values for rule parameters. Such a modeling tool can be easily implemented, for example, using a data mining engine.

The module may also include a boundary editor 330 that is designed to limit the degree of freedom of the adaptive engine 310. The boundary editor sets ranges for the rule parameters that the engine can modify. The boundary editor is designed to allow control for management and marketing over the system. Formally, by setting boundaries to the various parameter values, a search space is defined, and the task of the adaptive engine 310 is to find an optimal point using the rules within this space. The optimal point is a one which has best scores using a predefined success function. The success function is a business based function which reflects the importance and values of various aspects of the operation, such as call duration, revenue generated in a call, customer satisfaction, and/or many other similar parameters.

The adaptive, self learning module 1 of the invention may further comprise a reporter module 340 which is responsible for informing management and marketing groups about the progress or changes that are injected by the adaptive engine, and to reflect the improvements in the desired business results. This is an additional mean of control over the adaptive engine.

The newly modified rules that the adaptive self learning module creates are simply changes in some of the rule parameters which then form a modified rule, which is sent to the management rules 302, and enforced on future interactions from terminals $T_1$-$T_n$. A new rule may be distributed among all the terminals, or only on a portion of them.

For example, $Rule_1$ may include the parameters $\{X_1, Y_1, Z_1\}$. This rule is enforced by some of the agents who use terminals $T_1$-$T_j$. Other agents, comply to rule $Rule_2$. According to the present invention, any sub-set of terminals $T_1$-$T_n$ may use slightly modified rules of the rules stored in rules storage 302. For example, the agents who use terminals $T_1$, $T_2$, $T_3$, may be assigned to apply a modified $Rule'_1$, having parameters $\{X'_1, Y_1, Z_1\}$, and the agents who use terminals $T_{t4}$, $T_{t5}$, $T_{t6}$ may be assigned to apply a modified $Rule''_1$ having parameters $\{X_1, Y_1, Z'_1\}$. All the interactions with customers by any of the agents are analyzed by adaptive engine 310, resulting in a more preferred variation of $Rule_1$. For example, the resulting preferred rule may be $Rule^*_1$ having parameters $\{X'_1, Y_1, Z_1\}$. There are a variety of known methods in literature for learning and adaptation.

Figure 3:
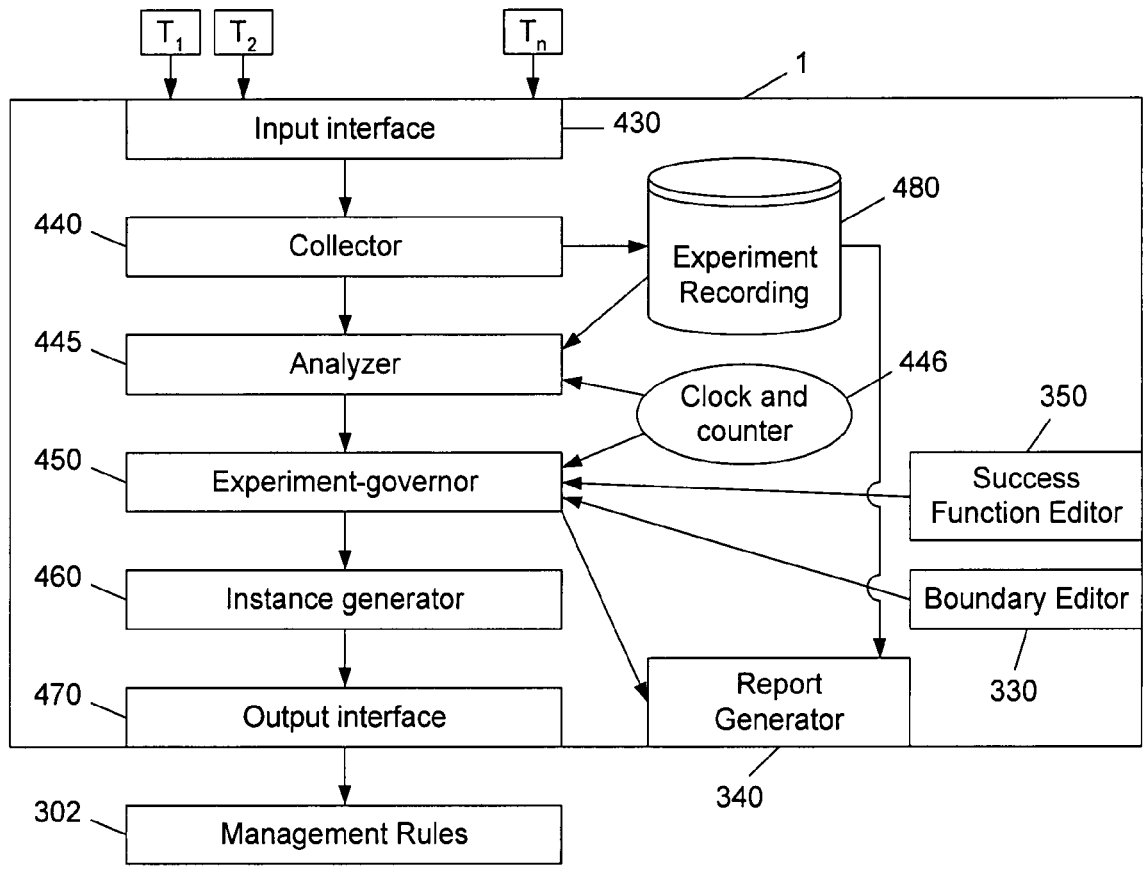
FIG. 3 is a more detailed block diagram of the adaptive, self learning module of FIG. 2.

FIG. 3 is a more detailed block diagram of the adaptive, self learning module 1, according to a possible embodiment of the invention. The module 1 has several interfaces, as follows: (a) input interface 430 allows for information about the interactions to be received at the module; (b) The optional boundary editor 330 allows for an external user, such as a call center administrator to set the learning process boundaries by setting limits or ranges of valid values for each of the desired rule parameters; (c) output interface 470 is used for exporting newly created or updated rules to the management rules 302; (d) the report generator 340 is used for informing the management of the call center about the progress and status of the learning, and business impacts of the process. In particular, the input interface 430 allows the collector 440 to monitor any information required for later analysis and evaluation of the interactions carried on terminals $T_1$-$T_n$; and (e) the success function editor, which allows the user to define the criteria for optimization, and the parameters that contribute to the formula of such optimization.

The module 1 of FIG. 3 further comprises a collector 440, which receives the interaction inputs (i.e., the rules parameters as used during the interaction, and additional parameters which are specific to that interaction—such as the time and duration of the interaction—all said parameters inclusive which relate to one specific interaction will be referred to herein as a "set of full interaction details") from input interface 430, and stores them in experiment recording database 480. The interaction inputs include, among others, the values of the rule parameters as observed during each specific interaction. In addition, each input contains information about the interaction and its outcomes, such as the customer response, a deal that was negotiated, the duration of the call and other values relating to the interaction. Preferably, before storing the interaction inputs, the collector 440 sorts the inputs, cleans the data, and prepares it for further processing by the analyzer 445.

The analyzer 445 processes the information stored in the experiment recording database 480. The analyzer 445 applies statistical methods to the collected data in order to generate preferences for more successful rules. Typically, the analyzer uses a success function to evaluate and score each interaction. The analyzer 445 uses the interaction scores to generate preferences to rules. In order to ensure that such a preference is statistically valid, the analyzer 445 uses global counters and clocks 446 to assure that the sample size properly corresponds to the entire search space defined by the parameter value space, and if necessary, to request more sample data.

Using the preferences and the indication about their statistical validity, the experiment governor 450 uses its inputs from analyzer 445 to manage the instance generator 460, and optionally to convey the required data to the report generator. The experiment governor is sensitive to information from the boundary editor for when (time of interaction), where (which terminals), and how often experiments can be conducted. Based on this information, the instance generator 460 takes the analysis results of the analyzer 445 (as passed by the Experiment Governor 450, and generates new version of rules to be deployed using the output interface 470.

Figure 4:
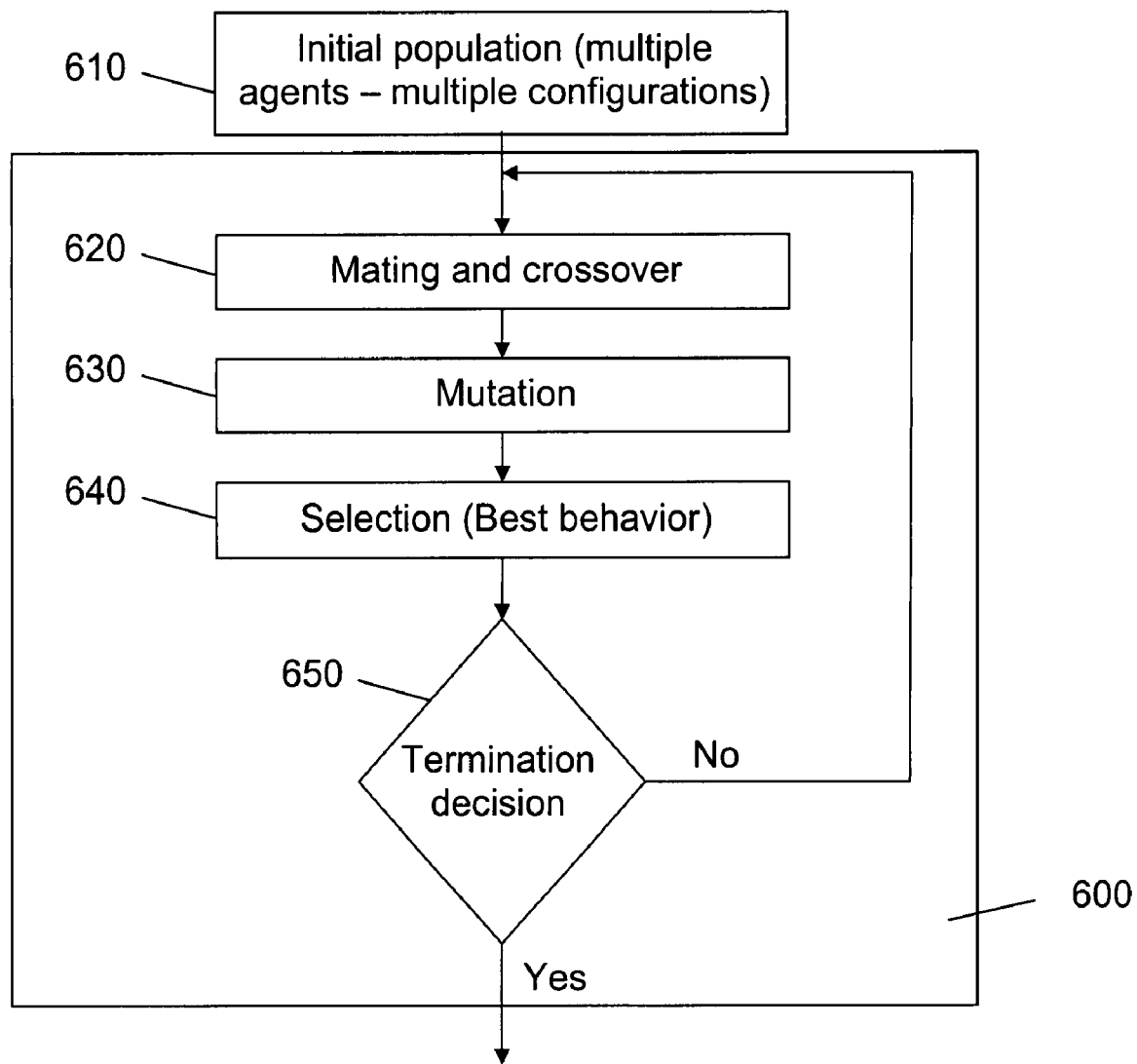
FIG. 4 shows a general implementation of a genetic algorithm, which is suitable for use in the system of the present invention.

One of the ways to implement the adaptive engine 310 is to use a genetic algorithm. A general implementation of a genetic algorithm is shown in FIG. 4. The genetic algorithm simulates the evolution of a population over time. With respect to the present case, the evolution is the development of the adaptation over time. Note, however, that the various stages of the genetic algorithm can be regarded as an instance of the internal units of the adaptive engine 310, as shown in FIG. 3. In particular, blocks 620, 630, and 640 of FIG. 4 are can be included within the analyzer 445 of FIG. 3. Similarly, the termination decision block 650 is included within the experiment governor 450 of FIG. 3.

In order to apply a genetic algorithm, each instance (in our case, the collection of rules applied to an interaction within one of the terminals $T_1$-$T_n$) is represented as a single vector of all the parameters values. This is equivalent to a chromosome of a live creature within the population. The entire population is therefore a collection of vectors.

In stage 610, the initial rules are defined, and this is the beginning stage of the learning algorithm. The set of vectors of the initial population is provided into stage 620, where mating of "genes" (the parameter vectors) is performed, and crossovers between the vector parts within each pair are carried out. The crossover process mimics the chromosome formation process from to genes. The result of the mating and crossover stage 620 is a possible set of new vectors. This set is further modified in the mutation stage 630, where parameters may be altered randomly within the allowed boundaries as define by the boundary editor 330 of FIG. 3. This mimics the generation of mutations in nature where some genes are arbitrarily modified. This process yields a suggested new population, in our case a set of candidate vectors. In the selection stage 640, successful vectors are selected. The success criteria is defined by a success function, which mimics the selection of a best-fit in nature. The success function defines the optimization goal. This directs the search for the optimal point within the search space defined by the boundary editor. In order to apply the success function, observation information is required. This is typically gathered by the collector module 440, which associates with each interaction the rules that were applicable and the performance information, and then stored in the experiment recording database 480.

As said before, the optimization process or search is guided by the optimization criteria. The required parameters for evaluating the optimization criteria are collected from the interactions by means of the input interface 430 of FIG. 3. Based on this information, various success functions can be defined. The following is an example of a success function skeleton:

| Variable | Coefficient | Importance |
|---|---|---|
| Handling Time | 2/3 | 1/X (min) |
| Revenue from call | 0.5 | $X^2$ |

The function is defined in this example as the sum of the product of the coefficient and importance of each row of the table. In this example, the success function is: $2/(3*time) + 0.5*Revenue*Revenue$.

Figure 5:
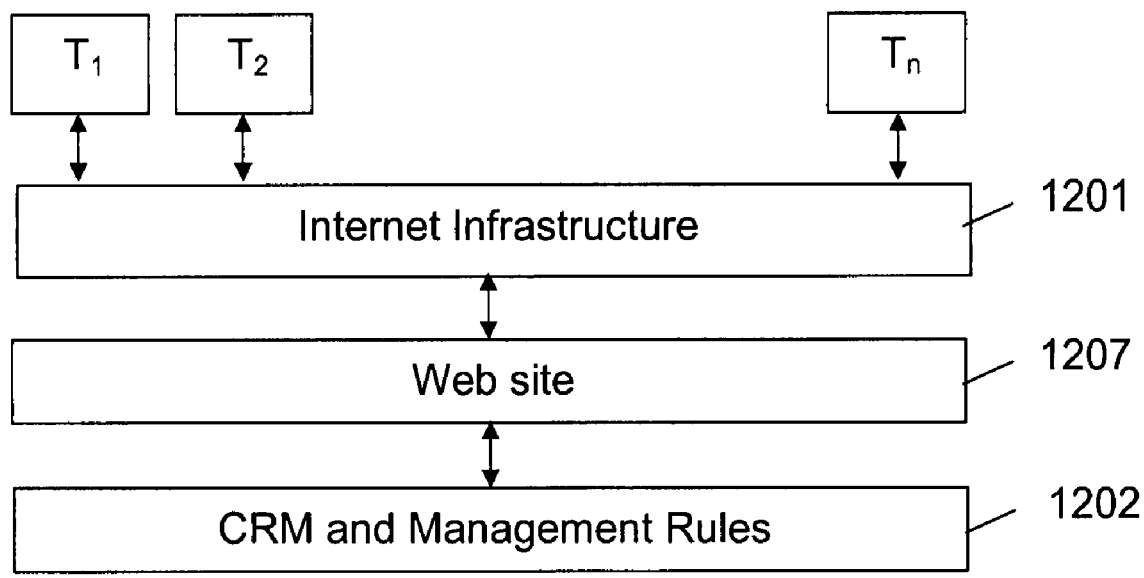
FIG. 5 is a block diagram illustrating a general structure of a typical Internet based corporate business service according to the prior art.

FIG. 5 is a block diagram illustrating a general structure of a typical Internet based corporate service according to the prior art, which relies on customers (or end users) that use their computers or end-device terminals $T_1$-$T_n$, to connect through the Internet 1201 to the corporate web-site 1207. On top or the web-site, the corporate uses a CRM application within layer 1202, (typically the same as the CRM application of FIG. 1) adapted for Internet access, to manage and control all of the customers' interactions. Within, or on top of the CRM of layer 1202, there is a layer of enforcement (management) rules which guarantee that all the customer interactions abide to the same management rules, in a similar manner as the interactions of the agents with the customers in the call center of FIG. 1 abide to the rules.

Figure 6:
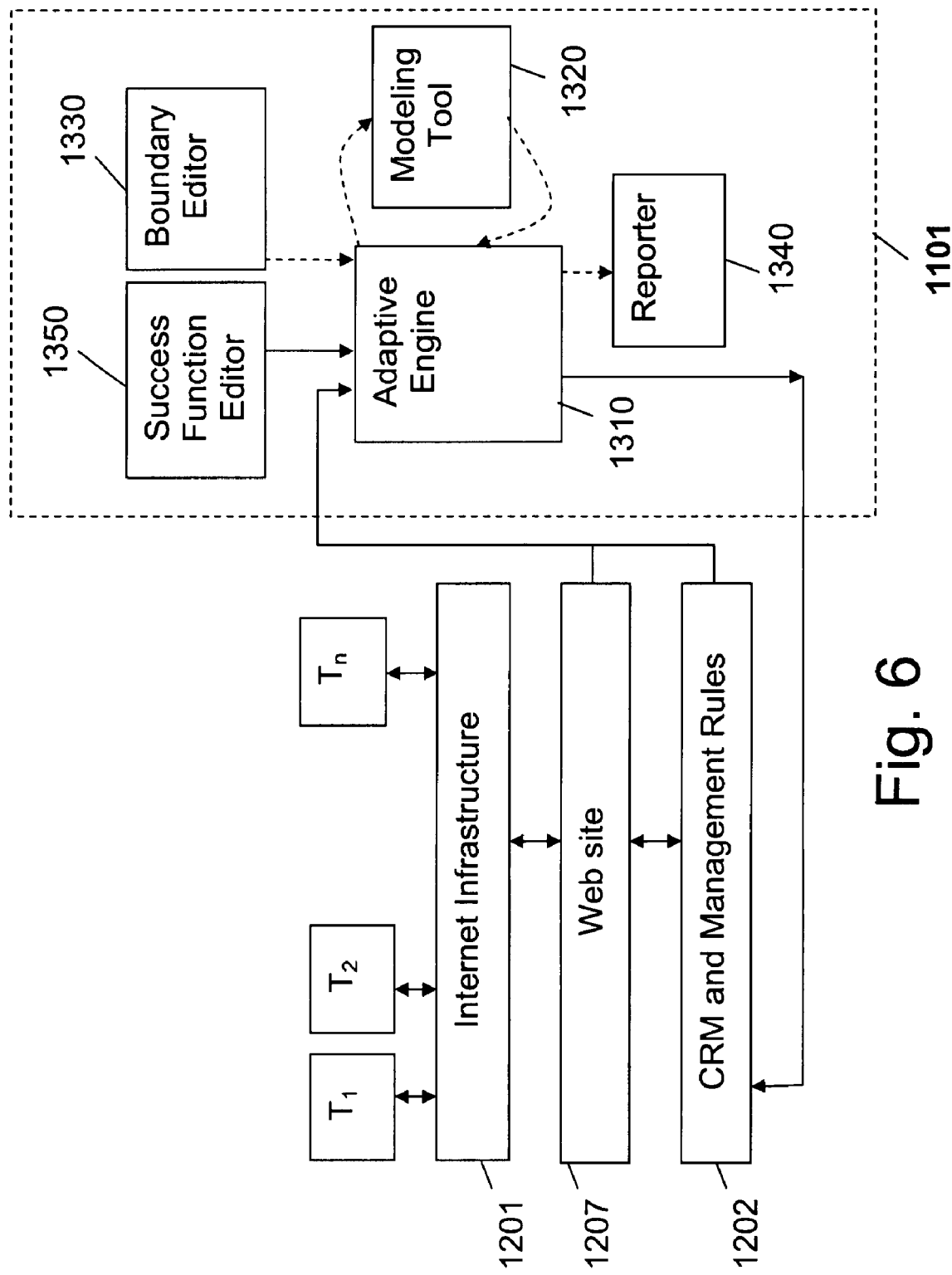
FIG. 6 is a general block diagram of the Internet based corporate business service which is provided with an adaptive, self learning module according to an embodiment of the present invention.

FIG. 6 shows a Web center according to the present invention, which is provided with an adaptive, self learning module 1001, whose operation is essentially the same as of adaptive, self learning module 1 of FIGS. 2, 3, and 4. The adaptive, self learning module 1001 is used for optimizing the rules of the Web site of FIG. 5. The operation and functions of the module elements 1310, 1320, 1330, 1340, and 1350 is the same as of the corresponding operations and functions of modules 310, 320, 330, 340, and 350. Therefore, throughout this application, including the claims thereof, when the term "call center" is used, it should be understood that this term relates also to a CRM based business application at a CRM center as of FIG. 5, for carrying out interactions with customers via the Web.

Since the rules that the corporate needs to enforce must be consistent, at least some of the rules and rule parameters that are applied over the Internet interactions (of FIG. 5) and over the call-center interactions (of FIG. 1) are the same (of course assuming that the corporate uses both a call center CRM and a Web CRM). In that case, the rules are typically stored in a separate rule-base which is accessible both by the CRM application of the call center and by the CRM application of the Website.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A call center system comprising:
a rule management unit comprising customer relation management (CRM) rules, wherein each CRM rule comprises one or more rule parameters, said rule parameters to enforce interaction behavior of agents in a call center during interactions with customers; and
an adaptive, self-learning module for automatic adaptive modification of said CRM rules, comprising:
a collector to receive information related to monitored interactions between the agents of the call center and customers;
a database to store sets of interaction details, wherein each set corresponds to a respective one of said monitored interactions and includes one or more rule parameters that were enforced during said interaction, values of said one or more rule parameters and interaction parameters;
an analyzer to periodically perform an adaptive analysis on at least a portion of said sets of interaction details; and
a generator to produce one or more modified CRM rules based on said analysis; wherein the adaptive module uses a genetic algorithm that simulates an evolution of a population over time.

2. The system according to claim 1, further comprising a boundary editor by which a user can limit the degree of freedom of modification by setting allowed ranges for modified rule parameters.

3. The system according to claim 1, wherein the analyzer uses a predefined success function to evaluate and score the interactions.

4. The system according to claim 3, further comprising a success function editor for enabling a user to define or modify said success function.

5. The system according to claim 1, further comprising a modeling tool for finding correlations between various sets of interaction details, predicting future interaction behaviors, and determining specific values for rule parameters.

6. The system according to claim 1, further comprising a reporter module for issuing reports regarding the progress or optimization changes that were affected by said adaptive, self learning module.

7. The system according to claim 1, further comprising a clock and counter for scheduling operations of said module.

8. The system according to claim 1, wherein the rule management unit receives the one or more modified CRM rules from the adaptive, self learning module for enforcement of interaction behavior of the agents during future interactions with customers.

9. The system according to claim 1, wherein the call center is a telephone call center comprising a plurality of agents' terminals, and wherein the CRM rules are enforced during operation of said terminals.

10. The system according to claim 1, wherein the call center is a Web based call center and the interactions with customers are via the Web.

11. The system according to claim 5, wherein the modeling tool comprises a data mining engine.

12. A call center computer-implemented method comprising:
receiving customer relation management (CRM) rules by an adaptive engine, wherein each CRM rule comprises one or more rule parameters, the rule parameters are to enforce interaction behavior of agents in a call center during interactions with customers;
receiving by an adaptive engine information related to monitored interactions between the agents of the call center and customers;
storing sets of interaction details within the adaptive engine, each set corresponding to a respective one of monitored interactions and each set comprising interaction parameters, one or more rule parameters that were enforced during the interaction and values of said one or more rule parameters;
periodically performing by the adaptive engine an adaptive analysis on at least a portion of said sets of interaction details; and
automatically generating, by the adaptive engine, based on said analysis, one or more modified CRM rules having modified rule parameters; wherein the generating uses a genetic algorithm that simulates an evolution of a population over time.

13. The method of claim 12 comprising:
sending the one or more modified CRM rules to a rule management unit; and
enforcing interaction behavior of the agents during future interactions with customers based on the one or more modified CRM rules.

14. The method of claim 12, wherein the analyzing is done in real time.

15. The method of claim 12 comprising:
sorting and preparing the received information for further processing prior to storing.

16. The method of claim 12, wherein analyzing comprises using a predefined success function to evaluate and score the interactions.

17. The method of claim 12, further comprising:
scheduling the operation of the adaptive engine.

18. The method of claim 12, wherein the call center is a telephone call center, comprising a plurality of agents' terminals, and wherein the rules are enforced during operation of said terminals.

* * * * *